Dec. 19, 1967 H. J. STRAUSS 3,359,138
SILVER ELECTRODES FOR ELECTRIC BATTERIES
Filed Jan. 7, 1965

INVENTOR.
Howard J. Strauss
BY
Darby, Robertson-Vandenburgh
Att'ys.

United States Patent Office 3,359,138
Patented Dec. 19, 1967

3,359,138
SILVER ELECTRODES FOR ELECTRIC
BATTERIES
Howard J. Strauss, Rockford, Ill., assignor to Clevite
Corporation, a corporation of Ohio
Filed Jan. 7, 1965, Ser. No. 424,025
13 Claims. (Cl. 136—120)

This invention relates to electric batteries, and more particularly refers to a novel method for the preparation of a porous silver electrode, and to the product prepared thereby.

Voltaic cells and batteries utilizing a silver oxide cathode, a zinc or cadmium anode, and an alkaline electrolyte are coming to be widely used. The advantages of such batteries are that they are highly efficient, have high capacity per unit volume, and may be recharged and reused many times. Moreover, they have a desirably flat discharge curve. In the production of such batteries, the fabrication of the anode does not present any real problem since a porous zinc or cadmium electrode having good mechanical strength may be readily prepared by compressing or sintering zinc or cadmium powder. However, the production of a suitable silver oxide cathode having satisfactory electrochemical properties, and yet one which will maintain its shape and integrity even after many cycles of discharging and charging has been attendant with serious problems. A suitable silver/silver oxide electrode should have extremely fine but yet uniform porosity. Such properties are necessary in order to achieve a high interfacial area between the electrolyte and the electrode in order to develop the best electrochemical properties. Moreover, it is desirable to achieve this porosity while still retaining the highest possible apparent density, in order to be able to store the greatest possible amount of energy within the smallest possible space. In addition to these properties, a good silver/silver oxide electrode should have extremely uniform physical dimensions and should be readily fabricated into various physical forms and shapes. Moreover, suitable means must be provided for transferring electrical energy to and from the electrode.

In the past, electrodes have been prepared from silver chloride sheet, with the silver chloride subsequently being converted to silver oxide by direct chemical reaction with the electrolyte within the assembled cell. However, this method has had several drawbacks. First, the mechanical strength of such an electrode has not been entirely satisfactory. Second, the method results in the introduction of chloride ions in the cell electrolyte, a highly undesirable condition, and one which has a deleterious effect upon the performance of the cell. In order to avoid these difficulties, it has been attempted to prepare a porous silver electrode by forming a mixture of silver chloride and silver metal, consolidating the mixture into an electrode element, and subsequently cathodically electrolyzing the element. However, even this method has had some technical drawbacks in that the initial incorporation of sufficient metallic silver in the silver chloride electrodes to provide suitable conductivity for subsequent electrolysis has an adverse effect upon the structure of the resulting silver electrode. Moreover, such a method is not adaptable to modern mass production.

It is an object of the present invention to provide a novel method for the production of a porous silver electrode which can be subsequently oxidized to form a silver/silver oxide electrode.

It is a further object to provide such a method wherein the resulting electrode has a high degree of porosity.

It is an additional object to provide such a method wherein the resulting electrode has a porosity which is extremely uniform.

It is another object of the invention to provide a silver electrode which is substantially free of chloride ions.

It is still further an object to provide a method for preparing porous silver electrodes of the type described which is highly adaptable to mass production methods.

Other objects and advantages of the invention will become apparent from the following discussion and from the drawing in which.

According to the invention, silver chloride substantially free of metallic silver admixture is heated to its melting point and solidified to form electrode members or plates. In one embodiment of the invention the molten silver chloride is poured into a mold over a current collector or grid and solidified. In the preferred embodiment, the silver chloride is first heated to at least the melting point, poured into a mold, and solidified, generally in the form of a slab. The slab is then rolled on a rolling mill until sheets of the desired thickness are produced. The sheets are then cut to proper size and shape and provided with a suitable conducting grid or current collector, as for example by embedding by means of heat and pressure. The silver chloride electrode member, produced by either embodiment, is then preferably treated with a chemical reducing agent to form a thin metallic silver coating over the surface thereof. The electrode member is then placed in an electrolytic bath and cathodically reduced by the application of an electric current to form a porous silver electrode substantially free of chloride ions. The electrode may subsequently be oxidized by a method such as anodic electrolysis to convert a substantial proportion of the electrode to silver oxide.

Figure 1:
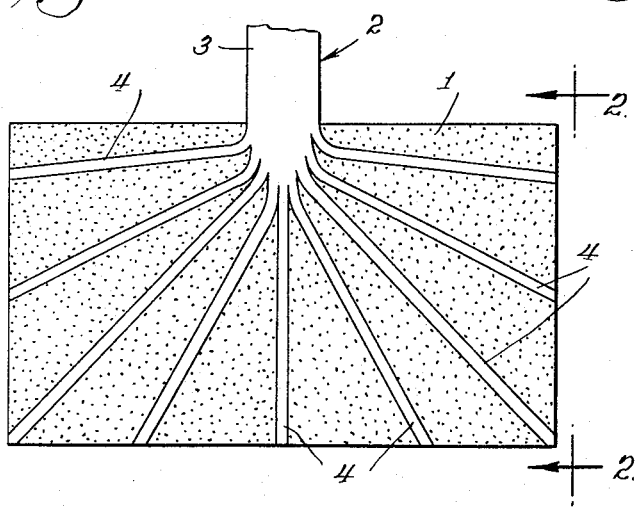
FIG. 1 is a plan view of an electrode according to the invention.
Figure 2:
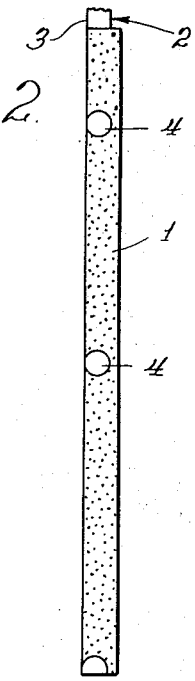
FIG. 2 is an end view, on an enlarged scale, taken at the line 2—2 of FIG. 1.

Referring to the drawing, FIGS. 1 and 2 show a porous silver electrode comprising a porous silver plate 1 and a current collector 2 composed preferably of solid silver and comprised of a lead-in conductor 3 having a plurality of radiating filaments 4 embedded in the plate 1. The current collector is embedded in the plate while the plate is still in the form of silver chloride. Embedding is accomplished either by immersing the current collector in the silver chloride while it is in molten form and subsequently cooling, or, alternatively, by embedding the current collector in rolled silver chloride sheet by applying heat and pressure.

Figure 3:
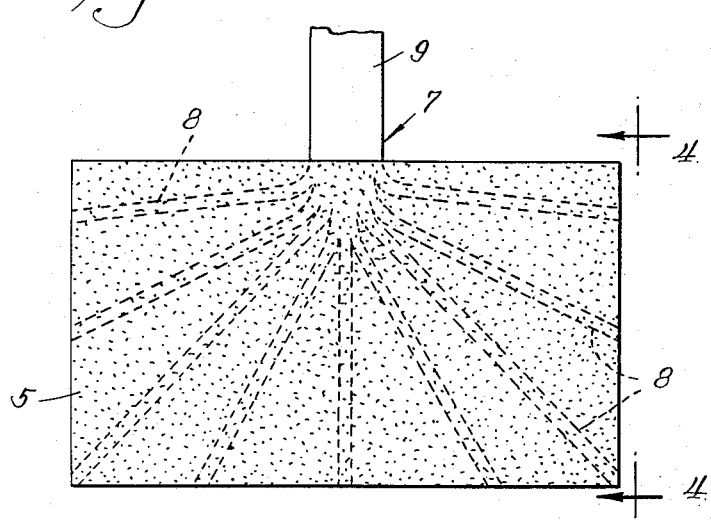
FIG. 3 is a plan view of a modified embodiment of the invention.
Figure 4:
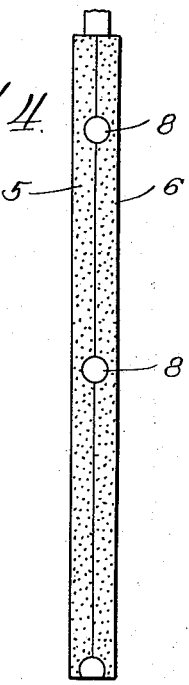
FIG. 4 is an end view, on an enlarged scale, taken at the line 4—4 of FIG. 3.

The embodiment shown in FIGS. 3 and 4 comprises a pair of porous silver plates 5 and 6 having current collector 7 comprised of silver wire filaments 8 terminating in an external conductor 9.

The structure of FIGS. 3 and 4 is prepared by inserting the current collector filaments 8 between two slabs of silver chloride, and subsequently applying heat and pressure to embed the filaments in the plates 5 and 6 to cause the plates to adhere to each other. In order to complete the silver electrode structures of both FIGS. 1 and 2 and FIGS. 3 and 4, the silver chloride electrode members produced as described above are then chemically treated with a reducing agent to produce a thin film of metallic silver on the surfaces thereof, and cathodically electrolyzed in a suitable electrolyte bath to reduce the silver chloride to metallic silver.

Although, as described, above, cast silver chloride substantially free from admixed metallic silver may be used to form the cathode plates, rolled silver chloride is far superior since it is tough, flexible and non-brittle, and may be prepared in thin sheet forms within precise dimensions. It retains these properties indefinitely if not exposed to strong sun light. If desired, the strains formed during the rolling process may be removed by annealing at a temperature of for example 400° F. for a period of about 30 seconds or less. This annealing process leaves the sheet soft and pliable.

After the silver chloride sheets have been cast or rolled to the proper thickness, they are cut to the desired size and shape and each electrode plate thus formed is provided with a solid metal current collector. This is done by embedding a current collector grid having external lugs, and composed, advantageously, of metallic silver, into the silver chloride sheet under moderate pressure and heat. For this purpose, the sheet may be heated to a temperature in the range of from about 400° to about 450° F. Upon cooling, the structural and electrical conducting members are intimately bonded to the silver chloride sheet. In forming the electrode of FIGS. 3 and 4, the grid is inserted between two silver chloride sheets and subjected to heat and pressure in the same manner to bond the sheets to the grid and to bond the sheets to each other. In an alternative method, molten silver chloride is cast into a steel mold holding a suitably positioned grid structure. Since the silver chloride has a high shrinkage factor, it can be readily removed from the mold after solidification. This method is particularly useful for preparing thick sheets, rods, tubes, etc.

Since electrical conductivity of silver chloride is very low, before it can be subjected to the cathodic reduction proess, the electrode member is preferably treated to increase its conductivity for the subsequent electrolyzing treatment. This may be accomplished by immersing the electrode member in a chemical reducing solution to develop a thin metallic silver film at the surface of the electrode member. Any suitable reducing agents may be used such as an aqueous solution of hydroxylamine. Other suitable reducing agents are aqueous solutions of any of the common photographic developers, such as p-aminophenol, o-aminophenol, amidol (2,4-diaminophenol hydrochloride), metol (p-methylaminophenol sulfate), hydroquinone or catechol. A suitable commercial developer is Kodak Dektol. Generally, immersion of the electrode member for about one minute or more provides a suitable silver coating.

The surface reduction of the silver chloride member may be dispensed with if the member, including the portion immediately adjacent the external lead of the current collector and this portion of the current collector itself, is immersed in the electrolyzing bath. Using this technique, reduction of the silver chloride starts in the vicinity of the collector lead and spreads over the surface of the electrode member as the reduction proceeds into the body of the member.

After the formation of a silver coating on the electrode member, the member is placed in a suitable electrolytic bath containing an electrolyte such as potassium hydroxide. The electrode member is made cathodic and a material such as silver or silver plated copper or any other relatively inert conductive material may be utilized as the anode. Alternatively, a dilute salt solution may be utilized as the electrolyte with an inert magnesium anode. A suitable direct electrical current is applied to the electrodes, negative polarity being applied to the silver chloride electrode member, and the process continued until the silver chloride has been completely reduced to metallic silver.

A silver electrode so produced has been found to have uniquely high porosity, high density, and very fine and very uniform pores. Subsequent to its formation, the porous silver electrode may be electrochemically oxidized until a substantial portion has been oxidized to silver oxide. In this process, the solid metallic current collector grids are not appreciably oxidized. This electrode may then be assembled into a cell, such as a silver oxide-zinc cell or into a silver oxide-cadmium cell.

The process described above results in the production of highly uniform electrodes both electrochemically and physically, which exhibit superior electrical properties and long operating life. Moreover, porous silver and silver oxide electrodes of the type described may be fabricated by relatively simple equipment and at a relatively low cost.

The following examples are presented for illustrative purposes only and are not to be considered as limiting the scope of the invention.

*Example 1.—Prepartion of porous silver electrode*

A sheet of solidified fused silver chloride 0.030 inch thick was cut to a size of 1⅞ x 2¼ inches. A silver wire current collector or grid similar to that shown in the drawing was fabricated. The silver wire collector was firmly embedded in the silver chloride sheet on a heated hydraulic press, using a force of six tons and a temperature of 400° F. on each press plate. The sheet at this point comprised 11.33 g. silver chloride and 0.67 g. silver wire. The silver chloride sheet was then vapor degreased with perchloroethylene and the surface of the sheet reduced by immersing in a standard solution of Kodak Dektol photographic developer. After a metallic silver film had formed on the surface, the sheet was placed in an electrolytic forming cell as the negative electrode, using magnesium plates as the positive electrode, and a 5% potassium hydroxide electrolyte. A direct electrical current was applied to the forming cell, the negative terminal to the silver chloride electrode and the positive terminal being applied to the magnesium plate. Electrolysis was continued as a rate of about 20 ma./in.$^2$ of silver chloride surface until the silver chloride was completely reduced to metallic silver. The silver plate was then washed in running water overnight, pressed wet at room temperature under a force of six tons and permitted to dry. The resulting electrode had uniform dimensions, was mechanically strong, and was very porous.

*Example 2.—Comparative example*

In order to compare the physical properties and electrical performance of silver electrodes prepared from rolled silver chloride sheets with those of electrodes produced from silver oxide paste, 13 electrodes were prepared from silver chloride sheets and 12 electrodes were prepared by the silver oxide-water paste method. In each case the lateral dimensions of the electrodes were 1¾ inch x 2⅛ inch with the stated thicknesses. The electrodes were prepared from silver chloride as described above in Example 1. All the plates were subjected to pressing at six tons total force. The plates were also provided with silver wire collectors as shown in the drawing. The porous silver electrodes of the invention were assembled into a battery and subsequently charged to convert a portion thereof to silver oxide. The table below compares the average values obtained of physical and electrical properties of the electrode when fabricated into cells and tested.

TABLE

| | Electrode from Silver Chloride | Electrode from Silver Oxide Paste |
|---|---|---|
| Wt. of silver in grams | 8.6±1.0 | 6.46±0.9 |
| Avg. thickness in inches | 0.0279±0.002 | 0.0291±0.005 |
| Avg. density in grams per cubic centimeter | 5.16±0.3 | 3.69±0.3 |
| Ampere hour capacity of silver oxide electrode | 2.14±0.2 | 1.61±0.2 |

As is readily apparent from the table, the silver electrodes prepared from silver chloride sheet had a greater density, a smaller thickness, and gave a considerably higher capacity than the electrodes prepared by the paste method.

Although the invention has been described in detail in relation to only relatively few specific embodiments, it is to be understood that many variations may be practiced by those skilled in the art without departing from the spirit or scope thereof, within the limits defined by the appended claims.

Invention is claimed as follows:

1. A method for the preparation of a porous silver electrode substantially free from chloride ions which comprises forming an electrode member from solidified fused silver chloride substantially free from metallic silver, providing said electrode member with an electrically conductive current collector, chemically reducing the surface of said electrode member to form a thin metallic silver coating thereon, and cathodically electrolyzing the silver chloride of said electrode member in a suitable electrolyte bath until substantially all of the silver chloride has been reduced to metallic silver.

2. A method according to claim 1 wherein said current collector is embedded in said silver chloride electrode member by means of heat and pressure.

3. A method for the preparation of a porous silver electrode substantially free from chloride ions which comprises forming an electrode member from rolled silver chloride, providing said electrode member with an electrically conductive current collector, chemically reducing the surface of said electrode member to form a thin metallic silver coating thereon, and cathodically electrolyzing the silver chloride of said electrode member in a suitable electrolyte bath until substantially all of the silver chloride has been reduced to metallic silver.

4. A method according to claim 3 wherein said current collector is embedded in said silver chloride electrode member by means of heat and pressure.

5. A method for the preparation of a porous silver electrode substantially free from chloride ions which comprises forming a pair of electrode members from rolled silver chloride, inserting an electrically conductive current collector between said electrode members and applying heat and pressure to said electrode members to embed said current collector therein and to cause said electrode members to adhere to each other, chemically reducing the surface of said electrode members to form a thin metallic silver coating thereon, and cathodically electrolyzing the silver chloride of each of said electrode members in a suitable electrolyte bath until substantially all of the silver chloride has been reduced to metallic silver.

6. A method for the preparation of a porous silver electrode substantially free from chloride ions which comprises rolling solidified fused silver chloride into sheets and forming an electrode member therefrom, providing said electrode member with an electrically conductive current collector, chemically reducing the surface of said electrode member to form a thin metallic silver coating thereon, and cathodically electrolyzing the silver chloride of said electrode member in a suitable electrolyte bath until substantially all of the silver chloride has been reduced to metallic silver.

7. A method according to claim 6 wherein said current collector is embedded in said silver chloride electrode member by means of heat and pressure.

8. A method for the preparation of a porous silver electrode substantially free from chloride ions which comprises rolling solidified fused silver chloride into a sheet and forming a pair of electrode members therefrom, inserting an electrically conductive current collector between said electrode members and applying heat and pressure to said electrode members to embed said current collector therein and to cause said electrode members to adhere to each other, chemically reducing the surface of said electrode members to form a thin metallic silver coating thereon, and cathodically electrolyzing the silver chloride of each of said electrode members in a suitable electrolyte bath until substantially all of the silver chloride has been reduced to metallic silver.

9. A method for the preperation of a porous silver electrode substantially free from chloride ions which comprises heating silver chloride to at least the fusing temperature, inserting an electrically conductive current collector in said fused silver chloride and solidifying the fused silver chloride in the form of an electrode member plate, chemically reducing the surface of said electrode member to form a thin metallic silver coating thereon, and cathodically electrolyzing the silver chloride of said electrode member plate in a suitable electrolyte bath until substantially all of the silver chloride has been reduced to metallic silver.

10. A method for the preparation of a porous silver electrode substantially free from chloride ions which comprises heating silver chloride to at least the fusion temperature, solidifying the fused silver chloride, rolling said solidified silver chloride into a sheet and forming an electrode member therefrom, providing said electrode member with an electrically conductive current collector, chemically reducing the surface of said electrode member to form a thin metallic silver coating thereon, and cathodically electrolyzing the silver chloride of said electrode member in a suitable electrolyte bath until substantially all of the silver chloride has been reduced to metallic silver.

11. A method for the preparation of a porous silver electrode substantially free from chloride ions which comprises heating silver chloride to at least the fusion temperature, solidifying the fused silver chloride, rolling said solidified silver chloride into a sheet and forming a pair of electrode members therefrom, inserting an electrically conductive current collector between said electrode members and applying heat and pressure to said electrode members to embed said current collector therein and to cause said electrode members to adhere to each other, chemically reducing the surface of said electrode members to form a thin metallic silver coating thereon, and cathodically electrolyzing the silver chloride of each of said electrode members in a suitable electrolyte bath until substantially all of the silver chloride has been reduced to metallic silver.

12. A method for the preparation of a porous silver oxide electrode substantially free from chloride ions which comprises forming an electrode member from rolled silver chloride, providing said electrode member with an electrically conductive current collector, chemically reducing the surface of said electrode member to form a thin metallic silver coating thereon, cathodically electrolyzing the silver chloride of said electrode member in a suitable electrolyte bath until substantially all of the silver chloride has been reduced to metallic silver, and anodically electrolyzing said silver until a substantial portion thereof has been oxidized to silver oxide.

13. A method for the preparation of a porous silver electrode substantially free from chloride ions which comprises forming an electrode member from solid silver chloride substantially free from metallic silver, embedding an electrically conductive current collector having an external lead in the silver chloride member, and cathodically electrolyzing the silver chloride of said electrode member in a suitable electrolyte bath with at least the portion of the external lead of said current collector adjacent said electrode member immersed in said bath until substantially all of the silver chloride has been reduced to metallic silver.

(References on following page)

References Cited

UNITED STATES PATENTS

| | | | |
|---|---|---|---|
| 692,298 | 2/1902 | Jungner | 204—109 |
| 3,120,457 | 2/1964 | Duddy | 136—30 X |
| 2,988,587 | 6/1961 | Haring | 136—120 X |
| 3,006,821 | 10/1961 | Haring | 136—120 X |
| 3,185,591 | 5/1965 | Bartfai et al. | 136—6 X |

FOREIGN PATENTS 712,561   7/1954   Great Britain.

WINSTON A. DOUGLAS, *Primary Examiner.*

N. P. BULLOCH, O. F. CRUTCHFIELD,
*Assistant Examiners.*